UNITED STATES PATENT OFFICE.

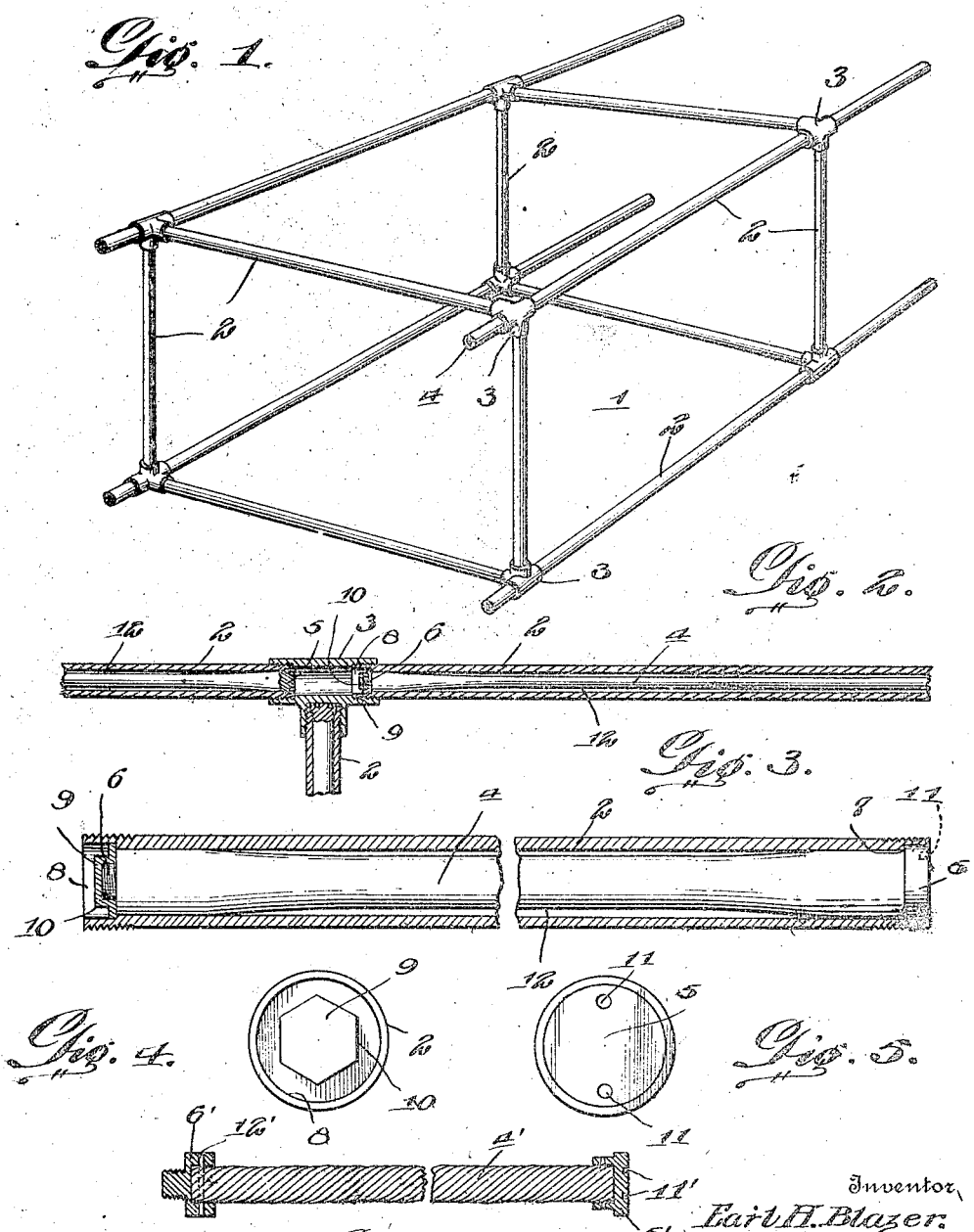

EARL H. BLAZER, OF KANSAS CITY, MISSOURI.

AEROPLANE-FRAME CONSTRUCTION.

1,302,293.

Specification of Letters Patent.

Patented Apr. 29, 1919.

Application filed November 4, 1916. Serial No. 129,592.

*To all whom it may concern:*

Be it known that I, EARL H. BLAZER, a citizen of the United States, residing at Kansas City, in the county of Jackson and State of Missouri, have invented new and useful Improvements in Aeroplane-Frame Construction, of which the following is a specification.

This invention relates to improvements in the construction of frames for aeroplanes and similar aerial vehicles, and particularly to frame constructions of that kind made in whole or part of steel tubing.

The primary object of the invention is to provide a construction whereby steel tubing may be employed with greater advantage, and with less liability of the tubes bending or breaking transversely under buckling strains.

A further object of the invention is to provide steel metallic tubing for aeroplane frame construction having strengthening cores disposed therein and operative to resist transverse fracture of the tubes while permitting of a desired range of flexibility thereof.

The invention consists of the features of construction, combination and arrangement of parts hereinafter fully described and claimed, reference being had to the accompanying drawing in which:—

Figure 1 is a perspective view of a portion of the frame work of an aeroplane constructed in accordance with my invention.

Fig. 2 is a detail section through a portion of the frame at a point where several tubes are joined together.

Fig. 3 is a vertical longitudinal section through one of the tubes.

Figs. 4 and 5 are opposite end elevations thereof.

Fig. 6 is a view similar to Fig. 3 showing a modification in the reinforcing core.

Referring to the drawing, 1 designates a portion of the frame of an aeroplane, which is composed in whole or part of steel tubes 2, which tubes may be united at meeting points by coupling members 3, in the form of L-couplings, T-couplings, or other forms of couplings according to the number and arrangement of the tubes to be joined together. It will, of course, be understood that the parts may be united by screw threaded connections, pin or rivet fastenings, welding or any other of the modes of connecting steel tubes commonly employed.

For the purpose of reinforcing each tube against buckling or fracture under transverse strains, I provide within the bore of the tube a core or filler of a suitable kind which while reinforcing the tube firmly and securely will at the same time permit it to have a desired range of flexibility. In the form of the invention illustrated particularly in Figs. 3, 4 and 5 a core 4 is disposed within the steel frame 2 and comprises a solid rod having at one end a head 5 and at its opposite end a reduced, threaded stem 6. The head 5 fits within a counterbore or recess 7 intersecting the bore of the tube at one end thereof, while the stem 6 projects into a similar counterbore or recess 8 at the opposite end of the tube, which counterbore or recess receives a retaining and clamping nut 9 having an angular head 10 for the reception of a socket wrench or other tool whereby the nut may be applied and removed, as will be readily understood. The counterbores 7 and 8 enlarge the main bore at the ends of the tube sufficiently to receive the head and nut and permit the same to terminate flush with the ends of the tube, so that the tube may be joined to other tubes in a ready and convenient manner by means of couplings of the character described. It will, of course, be understood that the recesses 7 and 8 may be made as long or deep as desired so as to dispose the head and nut at any required distances from the ends of the tube to permit such ends to receive the interfitting ends of other tubes, when it is desired to directly connect adjoining tubes together. The head 5 may be provided with recesses 11 to receive projections upon a spanner wrench to facilitate the threading and unthreading actions in clamping and releasing the core. As shown, the head and nut bear against the shoulders formed by the recesses or counterbores 7 and 8 and thus firmly clamp the core 4 in position.

The core 4 may be, and preferably is, made of spring steel, so that while said core, the end portions of which closely fit within the bore of the tube, and the remainder and major portion thereof fits loosely therein, will reinforce the tube against breaking or buckling strains, it will also permit the tube to have sufficient flexion or resiliency to absorb shocks and jars to a determined degree. Also, if desired, the tube may be longitudinally tapered or recessed, as indicated at 12, thus allowing it to bend or flex more freely or to have a greater range of resilient action to permit transverse flexion of the tube without undue resistance while reinforcing the tube against buckling or fracture.

In the form of my invention shown in Fig. 6, I have disclosed a core 4' made of a steel wire or cable, which fits at its ends in ferrules or sleeves upon head pieces 5' and 6' performing the same functions as the head and stem portions 5 and 6 of the core 4, said members being united to the cable by fastening pins or rivets 12'. This cable will give ample flexibility under all normal conditions of service, but it may be tapered like the core 4 for the purpose described.

I claim:—

1. A structural element for aircraft, comprising a metal tube having internal annular shoulders in the opposite ends thereof, a core within and extending throughout the length of said tube and having a head at one end bearing against one of said shoulders, and a nut threaded on the opposite end of said core and bearing against the shoulder at the other end of said tube.

2. A structural element for aircraft, comprising a metal tube having internal annular shoulders in the opposite ends thereof, a core within and extending throughout the length of said tube and having a head at one end bearing against one of said shoulders, and a nut threaded on the opposite end of said core and bearing against the shoulder at the other end of said tube, said core being reduced in diameter throughout the major portion of its length and having a bearing contact with said tube only adjacent to the end portions thereof.

In testimony whereof I affix my signature.

EARL H. BLAZER.